(12) United States Patent
Hu et al.

(10) Patent No.: US 8,578,042 B2
(45) Date of Patent: Nov. 5, 2013

(54) METHOD, SYSTEM AND DEVICE FOR PLAYING STREAMING MEDIA

(75) Inventors: Maowei Hu, Shenzhen (CN); Shengqian Yang, Shenzhen (CN); Nannan Gan, Shenzhen (CN); Hejun Hu, Shenzhen (CN); Zifeng Liu, Shenzhen (CN)

(73) Assignee: Xunlei Networking Technologies, Ltd., Shenzhen (CN)

( * ) Notice: Subject to any disclaimer, the term of this patent is extended or adjusted under 35 U.S.C. 154(b) by 340 days.

(21) Appl. No.: 12/679,467

(22) PCT Filed: Sep. 23, 2008

(86) PCT No.: PCT/CN2008/001643
§ 371 (c)(1),
(2), (4) Date: May 24, 2010

(87) PCT Pub. No.: WO2009/049478
PCT Pub. Date: Apr. 23, 2009

(65) Prior Publication Data
US 2010/0299443 A1    Nov. 25, 2010

(30) Foreign Application Priority Data
Sep. 25, 2007   (CN) .......................... 2007 1 0154686

(51) Int. Cl.
G06F 15/16   (2006.01)

(52) U.S. Cl.
USPC ........... 709/231; 709/203; 709/219; 709/223; 709/246; 725/91

(58) Field of Classification Search
USPC ............. 709/246, 219, 223, 231, 203; 725/91
See application file for complete search history.

(56) References Cited

U.S. PATENT DOCUMENTS 6,240,105 B1    5/2001   Zetts
7,318,107 B1 *  1/2008   Menon .......................... 709/239
(Continued)

FOREIGN PATENT DOCUMENTS

CN    1472963    2/2004
CN    1852283    10/2006
(Continued)

OTHER PUBLICATIONS

International Search Report for PCT/CN2008/001643 mailed Jan. 8, 2009; 4 pages.
(Continued)

*Primary Examiner* — Wing F Chan
*Assistant Examiner* — Hitesh Patel
(74) *Attorney, Agent, or Firm* — Finnegan, Henderson, Farabow Garrett & Dunner LLP

(57) ABSTRACT

A method for playing streaming media is disclosed, which includes: determining at least two storages storing a media file according to information of the media file (400); obtaining media streaming data corresponding to the media file from at least one of the determined storages and playing the obtained media streaming data (401), thereby solving the problem in the prior art that the bandwidth pressure on the streaming media server is excessively heavy if the same streaming media server is accessed when the same media file is obtained when a large number of users perform the data transmission service at the same time in the present streaming media system. A system and a device for playing streaming media are also disclosed.

16 Claims, 7 Drawing Sheets

(56) References Cited

U.S. PATENT DOCUMENTS

| | | |
|---|---|---|
| 7,379,467 B1 | 5/2008 | Paul et al. |
| 7,379,967 B2 | 5/2008 | Izutsu et al. |
| 7,516,235 B2 | 4/2009 | Feig |
| 7,584,292 B2 | 9/2009 | Bae et al. |
| 7,716,321 B2 | 5/2010 | Dacosta |
| 7,725,534 B2 | 5/2010 | Fishhaut |
| 7,788,394 B2 | 8/2010 | Gregotski et al. |
| 7,865,928 B2 | 1/2011 | Hostyn et al. |
| 7,876,978 B2 | 1/2011 | Berger et al. |
| 2003/0050834 A1* | 3/2003 | Caplan ............ 705/14 |
| 2004/0024900 A1* | 2/2004 | Breiter et al. ............ 709/231 |
| 2004/0162787 A1* | 8/2004 | Madison et al. ............ 705/64 |
| 2004/0210948 A1 | 10/2004 | Jin et al. |
| 2004/0267952 A1* | 12/2004 | He et al. ............ 709/231 |
| 2007/0271380 A1* | 11/2007 | Chang et al. ............ 709/225 |
| 2008/0256255 A1* | 10/2008 | Mordovskoi et al. ......... 709/231 |
| 2010/0241757 A1 | 9/2010 | Hu et al. |

FOREIGN PATENT DOCUMENTS

| | | |
|---|---|---|
| CN | 1852431 | 10/2006 |
| CN | 1972441 | 5/2007 |

OTHER PUBLICATIONS

International Preliminary Examination Report for PCT/CN2008/001643 completed Mar. 30, 2010; 5 pages.
International Search Report for PCT/CN2008/001768 mailed Feb. 5, 2009; 4 pages.
International Preliminary Examination Report for PCT/CN2008/001768 issued Apr. 27, 2010; 6 pages.

* cited by examiner

METHOD, SYSTEM AND DEVICE FOR PLAYING STREAMING MEDIA

PRIORITY DATA

This application is a nationalization of PCT application Serial No. PCT/CN2008/001643, which claims benefit of priority to Chinese application Serial No. 200710154686.X.

FIELD OF THE INVENTION

The present invention relates to network communication technologies, and in particular, to a method, system and device for playing streaming media.

BACKGROUND OF THE INVENTION

A streaming media system is used to provide a user with instant playing of an audio and/or a video via the internet. The user communicates with a particular remote streaming media server via a client on a local computer, the remote streaming media server continuously transmits video and/or audio data in certain streaming media format to the client according to the request sent via the client by the user, and the client immediately parses the data according to the corresponding protocol upon receiving the data and presents the video and/or audio to the user.

Currently, the streaming media system in the internet market mainly includes a live system and an on-demand system. The live system provides the user with a real time data transmission service, in which the user can neither arbitrarily change the playing progress nor watch a certain video and/or audio at any time, and relatively low technical requirements are involved. While the on-demand system can perform the playing at any time and at any playback position as desired by the user, which of course results in the higher technical requirements.

As shown in FIG. 1, the streaming media system in the prior art includes two components: a streaming media server and clients.

The main function of the streaming media server is to collect, cache, schedule and transfer media contents, the main performance of the streaming media system depends on the performance and the quality of service of the streaming media server. Therefore, the streaming media server is the basis and a main part of the streaming media system. The streaming media server may interact with the client to satisfy the request from the client, and transmit the sequential streaming media data in a certain format to the client via a network.

The main function of the client is to establish close contact between the user and the streaming media server. The client may transfer a request to the streaming media server after receiving an instruction from the user; further, the client may receive data from the streaming media server, and play the video and/or audio data via a player after parsing the data according to a certain protocol, so that the user may enjoy the playing effect.

When the whole streaming media system is established, the system generally is provided with one streaming media server or one group of streaming media servers acting as the provider of streaming media data. When a request instruction is transmitted from a client, the streaming media server receives the request instruction and then encodes the streaming media data required by the client at a certain code rate through computing, and transmits the streaming media data to all the clients requesting this streaming media resource through a streaming media transmission protocol, such as Real-Time Streaming Protocol (RTSP). The client may monitor the network, and after receiving sufficient streaming media data transmitted from the streaming media server, the client decodes and plays back the streaming media data, i.e., restores the streaming media data to the audio and/or video information for playing.

However, in the streaming media system in the prior art, when a large number of users request for the same media file simultaneously during the data transmission service, the same streaming media server is accessed, thus resulting in excessive bandwidth pressure on the streaming media server, so that the streaming media server is unable to provide a smooth and clear media streaming for the user, and hence the user experience is decreased, further, it is necessary to increase the number and bandwidth of the streaming media servers when the number of users rapidly increases, so that the cost is increased.

SUMMARY OF THE INVENTION

Embodiments of the invention provide a method, system and device for playing streaming media, to address the problem in the prior art that an excessive bandwidth pressure may be imposed on a streaming media server because the same streaming media server is accessed when a large number of users request for the same media file simultaneously during the data transmission service in the existing streaming media system.

An embodiment of the invention provides a method for playing streaming media, including:
 determining at least two storages storing a media file; and
 obtaining media streaming data corresponding to the media file from at least one of the determined storages, and playing the obtained media streaming data.

An embodiment of the present invention provides a system for playing streaming media, including:
 a determining module, adapted to determine at least two storages storing a media file;
 a processing module, adapted to obtain media streaming data corresponding to the media file from at least one of the determined storages; and
 a playing module, adapted to play the obtained media streaming data.

An embodiment of the invention provides a device for playing streaming media, including:
 a determining module, adapted to determine at least two storages storing a media file;
 a processing module, adapted to obtain media streaming data corresponding to the media file from at least one of the determined storages; and
 a playing module, adapted to play the obtained media streaming data.

In the embodiments of the invention, according to information of a media file, at least two storages storing the media file are determined; the media streaming data corresponding to the media file in at least one of the determined storages is obtained and then played, thereby reducing the bandwidth pressure on the streaming media server, providing a smooth and clear media streaming for the user, enhancing the user experience, and saving the cost since the number and the bandwidth of the streaming media servers need not to be increased when the number of the users increases rapidly.

DETAILED DESCRIPTION OF THE EMBODIMENTS

In embodiments of the present invention, at least two storages storing a media file required to be obtained are determined, thus, media streaming data may be obtained from at least two storages simultaneously and then played, thereby reducing the bandwidth pressure on the storages, and enhancing the playing speed and the user experience. The storage is an entity storing the media file, including but not limited to one or more of a client, a streaming media server, etc.

The embodiments of the present invention will now be described in detail with reference to the accompanying drawings.

Figure 1:
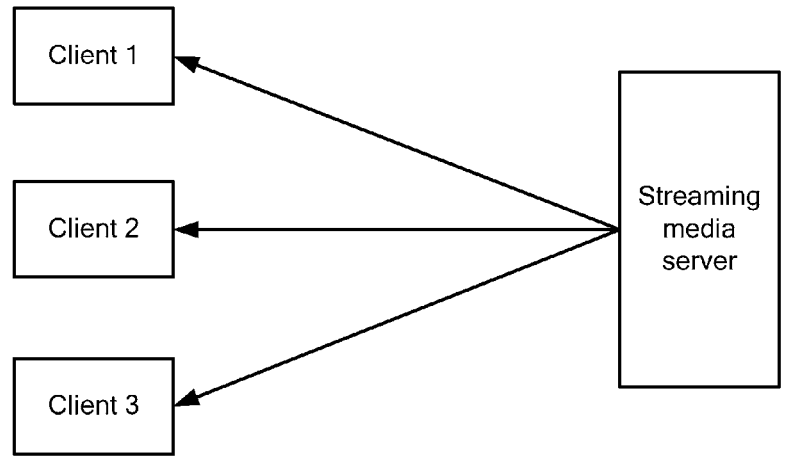
FIG. 1 is a schematic diagram showing the structure of a streaming media system in the prior art.
Figure 2A:
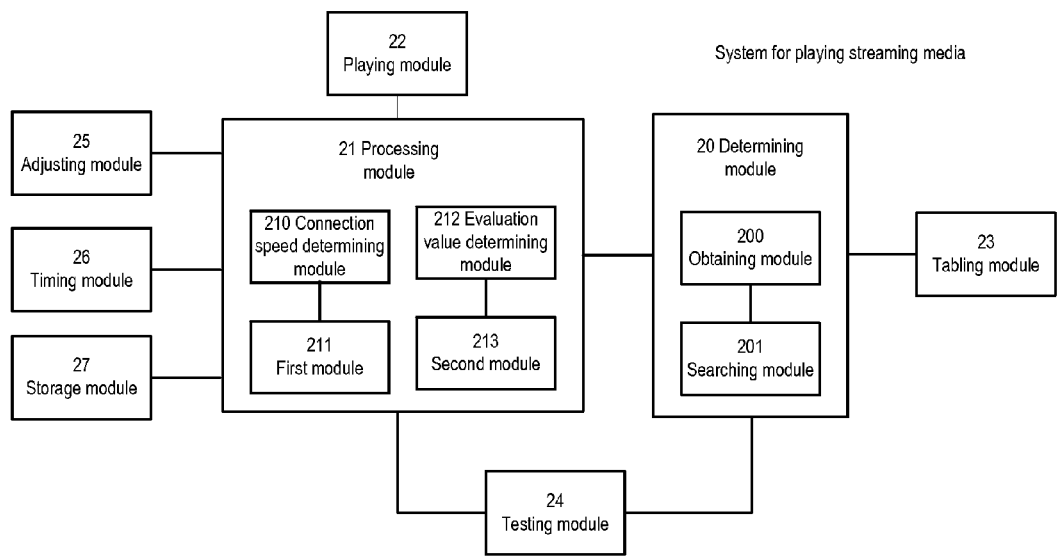
FIG. 2A is a structural representation of a system for playing streaming media according to an embodiment of the invention.

As shown in FIG. 2A, a system for playing streaming media according to the embodiment of the invention includes: a determining module 20, a processing module 21, and a playing module 22.

The determining module 20, which is connected with the processing module 21, is adapted to determine at least two storages storing a media file according to information of the media file.

The determining module 20 may further include: an obtaining module 200 and a searching module 201.

The obtaining module 200 is adapted to obtain the information of the media file, and the information of the media file includes an identification of the media file.

The information of the media file includes, but not limited to, one or more of a Uniform Resource Locator (URL) of the media file, a size of the media file, a name of the media file, and an identification of the media file.

The searching module 201 is adapted to determine at least two corresponding storages according to a preset first correspondence relationship between the identification of the media file and the information of the storages.

The processing module 21, which is connected with the determining module 20 and the playing module 22, is adapted to obtain media streaming data corresponding to the media file from at least one of the storages determined by the determining module 20.

The media streaming data at least includes media streaming data.

The playing module 22, which is connected with the processing module 21, is adapted to play the media streaming data obtained by the processing module 21.

The system for playing the streaming media may further include: a tabling module 23.

The tabling module 23, which is connected with the determining module 20, is adapted to allocate a unique identification for a media file, obtain the information of the storages storing the media file, and form the first correspondence relationship between the identification of the media file and the information of the storages.

The information of the storages includes, but not limited to, one or more of an address of the media file within the storage, and an identification of the storage.

The information of the storages may be obtained in various manners.

For example, a web spider program may be used to scan and record the storages storing the media files in the network.

Further, such a way that the user reports the correspondence relationship between the media file and the information of the storages may be used.

In the embodiment of the invention, the tabling module 23 may be provided in a streaming media server and/or a client, or independent from the streaming media server and the client.

The system for playing the streaming media may further include a testing module 24.

The testing module 24, which is connected with the determining module 20 and the processing module 21, is adapted to test a connection speed of each storage determined by the determining module 20.

In this case, the processing module 21 may include a connection speed determining module 210 and a first module 211.

The connection speed determining module 210 is adapted to determine a storage of which the connection speed is larger than a first threshold, in order to obtain the media streaming data corresponding to the media file in the at least two storages determined by the determining module 20.

The manner for determining the number of the storages for obtaining the media streaming data includes, but not limited to, one or more of setting by the user, selecting randomly, and selecting the storage of which the connection speed is larger than a threshold.

The first module 211 is adapted to obtain the media streaming data corresponding to the media file in the storage determined by the connection speed determining module 210.

The system for playing the streaming media may further include an adjusting module 25.

The adjusting module 25, which is connected with the processing module 21, is adapted to adjust the media streaming data corresponding to the media file obtained by the processing module 21 according to a received position parameter.

The position parameter may be obtained from dragging of a progress bar by the user. For example, if the user wants to watch the contents that are 15 minutes later, the user may drag the progress bar to the position desired, and the adjusting module 25 obtains the time stamp at the desired position, thereby adjusting the media streaming data corresponding to the media file obtained by the processing module 21, and moving the position for obtaining media streaming data forward to the position desired by the user.

The system for playing the streaming media may further include a timing module 26.

The timing module 26, which is connected with the processing module 21, is adapted to initiate a timer if the processing module 21 after the adjustment fails to obtain the media streaming data at the corresponding position of the media file in the storage entities, and make the processing module 21 stop obtaining the media streaming data at the corresponding position of the media file in the storage entities after the timer expires.

Further, the timing module 26 may be further adapted to make the processing module 21 retry to obtain the media streaming data after a period of time, and make the processing module 21 stop obtaining the media streaming data if the times of retrying is larger than a defined times.

The system for playing the streaming media may further include a storage module 27.

The storage module 27, which is connected with the processing module 21, is adapted to establish and store a second correspondence relationship between a storage and an evaluation value.

The evaluation value is a value indicating connection conditions of the storage.

In this case, the processing module 21 may include an evaluation value determining module 212 and a second module 213.

The evaluation value determining module 212 is adapted to determine the evaluation value corresponding to each storage according to the storages determined by the determining module 20 and the second correspondence relationship stored by the storage module 27, to obtain the media streaming data corresponding to the media file in the at least two storages determined by the determining module 20.

The second module 213 is adapted to obtain the media streaming data corresponding to the media file in the storage according to the evaluation value determined by the evaluation value determining module 212.

Here, if the evaluation value reflects such value that is more favorable for the connection if being larger, e.g. the connection speed and the bandwidth conditions of the storage, the second module 213 obtains the media streaming data corresponding to the media file in the storage of which the evaluation value is larger than a second threshold.

If the evaluation value reflects such value that is more favorable for the connection if being smaller, e.g. a breakage ratio and connection failure times of a storage, the second module 213 obtains the media streaming data corresponding to the media file in the storage of which the evaluation value is smaller than a third threshold.

In the embodiment, if the storage is a streaming media server, the information of the storages is the streaming media server information, and if the storage is a client, the information of the storages is the client information. Since at least two storages may be determined, it is possible that the determined storages include both the streaming media server and the client, the information of the storages is the corresponding streaming media server information and the client information.

All the modules in the embodiment may be incorporated in a client.

Figure 2B:
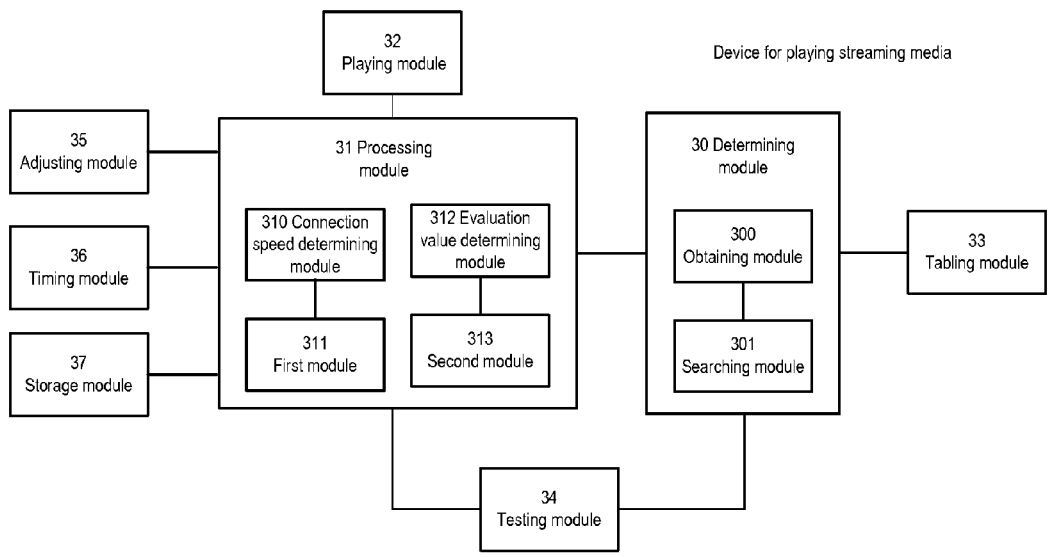
FIG. 2B is a structural representation of a device for playing streaming media according to an embodiment of the invention.

As shown in FIG. 2B, a device for playing streaming media according to the embodiment of the invention includes: a determining module 30, a processing module 31 and a playing module 32.

The determining module 30, which is connected with the processing module 31, is adapted to determine at least two storages storing a media file according to information of the media file.

The determining module 30 may further include: an obtaining module 300 and a searching module 301.

The obtaining module 300 is adapted to obtain the information of the media file, and the information of the media file may include an identification of the media file.

The information of the media file may include, but not limited to, one or more of a URL of the media file, a size of the media file, a name of the media file, and an identification of the media file.

The searching module 301 is adapted to determine the at least two corresponding storages according to a preset first correspondence relationship between the identification of the media file and the information of the storages.

The processing module 31, which is connected with the determining module 30 and the playing module 32, is adapted to obtain media streaming data corresponding to the media file from at least one of the storages determined by the determining module 30.

The media streaming data at least includes media streaming data.

The playing module 32, which is connected with the processing module 31, is adapted to play the media streaming data obtained by the processing module 31.

The device for playing the streaming media may further include a tabling module 33.

The tabling module 33, which is connected with the determining module 30, is adapted to allocate a unique identification for a media file, obtain the information of the storages storing the media file, and form the first correspondence relationship between the identification of the media file and the information of the storages.

The information of the storages may include, but not limited to, one or more of an address of the media file within the storage, and an identification of the storage.

The information of the storages may be obtained in various manners.

For example, a web spider program may be used to scan and record the storages storing the media files in the network.

Further, such a way that the user reports a correspondence relationship between the media file and the information of the storages may be used.

The device for playing the streaming media may further include a testing module 34.

The testing module 34, which is connected with the determining module 30 and the processing module 31, is adapted to test a connection speed of each storage determined by the determining module 30.

In this case, the processing module 31 may include: a connection speed determining module 310 and a first module 311.

The connection speed determining module 310 is adapted to determine a storage of which the connection speed is larger than a first threshold, in order to obtain the media streaming data corresponding to the media file in the at least two storages determined by the determining module 30.

The manner for determining the number of the storages for obtaining the media streaming data includes, but not limited to, one or more of setting by the user, selecting randomly, and selecting the storage of which the connection speed is larger than a threshold.

The first module 311 is adapted to obtain the media streaming data corresponding to the media file in the storage determined by the connection speed determining module 310.

The device for playing the streaming media may further include an adjusting module 35.

The adjusting module 35, which is connected with the processing module 31, is adapted to adjust the media streaming data corresponding to the media file obtained by the processing module 31, according to a received position parameter.

The position parameter may be obtained from dragging of a progress bar by the user.

The device for playing the streaming media may further include a timing module 36.

The timing module 36, which is connected with the processing module 31, is adapted to initiate a timer if the processing module 31 after the adjustment fails to obtain the media streaming data at the corresponding position of the media file in the storage entities, and make the processing module 31 stop obtaining the media streaming data at the corresponding position of the media file in the storage entities after the timer expires in a set time period.

Further, the timing module 36 may be further adapted to make the processing module 31 retry to obtain the media streaming data after a period of time, and make the processing module 31 stop obtaining the media streaming data if the times of retrying is larger than a defined times.

The device for playing the streaming media may further include a storage module 37.

The storage module 37, which is connected with the processing module 31, is adapted to establish and store a second correspondence relationship between a storage and an evaluation value.

The evaluation value is a value indicating connection conditions of the storage.

In this case, the processing module 31 may include an evaluation value determining module 312 and a second module 313.

The evaluation value determining module 312 is adapted to determine the evaluation value corresponding to each storage according to the storages determined by the determining module 30 and the second correspondence relationship stored by the storage module 37, to obtain the media streaming data corresponding to the media file in the at least two storages determined by the determining module 30.

The second module 313 is adapted to obtain the media streaming data corresponding to the media file in the storage according to the evaluation value determined by the evaluation value determining module 312.

If the evaluation value reflects such value that is more favorable for the connection if being larger, e.g. the connection speed and the bandwidth conditions of the storage, the second module 313 obtains the media streaming data corresponding to the media file in the storage of which the evaluation value is larger than a second threshold.

If the evaluation value reflects such value that is more favorable for the connection if being smaller, e.g. a breakage ratio and connection failure times of a storage, the second module 313 obtains the media streaming data corresponding to the media file in the storage of which the evaluation value is smaller than a third threshold.

In the embodiment, if the storage is a streaming media server, the information of the storages is the streaming media server information, and if the storage is a client, the information of the storages is the client information. Since at least two storages may be determined, it is possible that the determined storages include both the streaming media server and the client, the information of the storages is the corresponding streaming media server information and the client information.

The device for playing the streaming media may be a client, and the client may actively establish a connection based on Transmission Control Protocol (TCP) and Internetworking Protocol, User Datagram Protocol (UDP) or other connections with the storages, i.e., the streaming media servers and/or other clients.

If the device for playing the streaming media is provided with no tabling module 33, the device for playing the streaming media may search for the at least two storages storing the media file in a device including the tabling module 33.

Each tabling module 33 may either include a part of the first correspondence relationship between the identification of the media files and the information of the storages, or include the whole first correspondence relationship between the identification of the media files and the information of the storages.

If each tabling module 33 includes a part of the first correspondence relationship between the identification of the media files and the information of the storages, the device for playing the streaming media may fail to search out the storage storing the media file for the first time, subsequently, the search may be proceeded with using a flooding algorithm, that is, a first device including the tabling module 33 closest to the device for playing the streaming media may be first searched, if no storage storing the media file is found, a second device including the tabling module 33 closest to the first device is searched, and so on, until at least two storages storing the media file are found; alternatively, the search may be performed randomly.

Figure 3A:
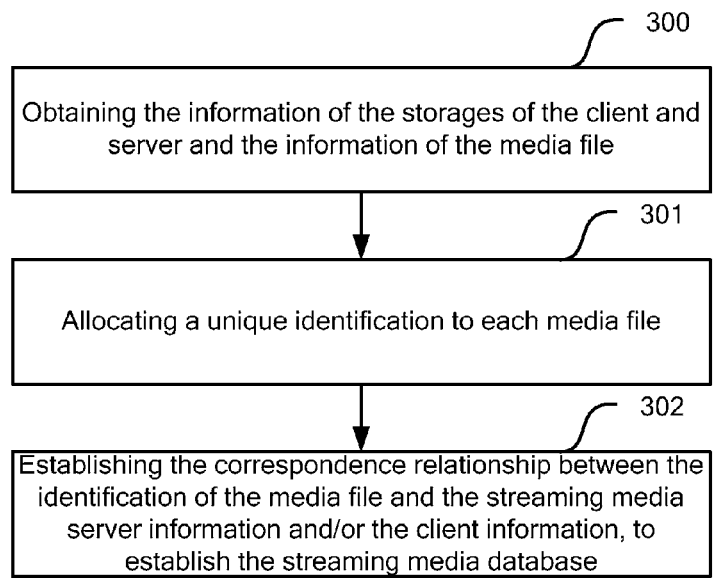
FIG. 3A is a flow chart of establishing a streaming media index database according to an embodiment of the invention.

The flow for establishing the first correspondence relationship is as shown in FIG. 3A. The flow for establishing the first correspondence relationship, such as a streaming media index database, according to the embodiment of the invention includes the following processes.

Process 300: The information of the storages of the client and the streaming media server and the information of the media file are obtained, for example, via the above-mentioned manners of the web spider and/or user report.

Process 301: A unique identification is allocated to each media file.

Where, there are many ways to allocate the identification, for example, one identification is allocated to each media file randomly, and each identification is unique;

Further, the identification may be allocated according to the hash algorithm shown in FIG. 3B as follows.

The hash algorithm is performed on each media file, thereby obtaining a file hash value, which can uniquely represent the media file and is called as Content Identity (CID) in the embodiment of the invention.

The hash algorithm employs Message-Digest Algorithm (MD) 5, MD4, Secure Hash Algorithm (SHA), or Secure Hash Standard (SHS), and the like, as a formula.

The Content Identity may be calculated in such a way that: beginning, middle and ending parts of the entire media file (or any other parts of the media file, even the whole media file), each having a size of 20 KB, are selected, and the selected three parts are subjected together to the hash operation by using the above-mentioned algorithm, thus obtaining a value, i.e., the CID.

Another way for computing the Content Identity is as follows: the media file is averaged into N parts with a certain length (such as 20K, 30K or any other value), and each of the N parts is subjected to the hash operation by using the above-mentioned algorithm, thus obtaining a value for each part, called as Block Content Identity (BCID); likewise, all the BCIDs are subjected to the hash algorithm, thus obtaining a value called as Global Content Identity (GCID), which acts as the Content Identity of the media file. These values are unique combination of numbers and/or alphabet on the internet, with the same media file corresponding to the same value and different media files corresponding to different values.

Figure 3B:
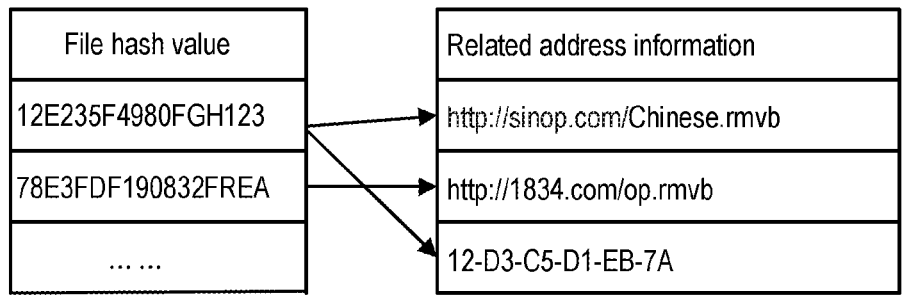
FIG. 3B is a schematic diagram of allocating an identification by using the hash algorithm according to an embodiment of the invention.

As shown in FIG. 3B, in a streaming media server of which the streaming media server information is http://sinop.com/chinese.rmvb and a client of which the client information is 12-D3-C5-D1-EB-7A (i.e., the MAC address of the client, according to which the IP address of the client may be obtained), a media file of which the file hash value is 12E235F4980FGH123 is stored.

Process 302: The correspondence relationship between the identification of the media file and the streaming media server information and/or the client information is formed, thereby establishing the streaming media index database.

Figure 4:
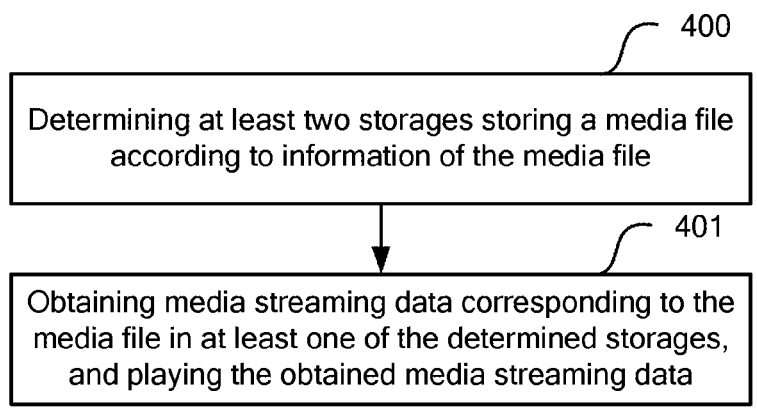
FIG. 4 is a flow chart of a method for playing streaming media according to an embodiment of the invention.

As shown in FIG. 4, a method for playing streaming media according to an embodiment of the invention includes the following processes.

Process 400: At least two storages storing a media file are determined according to the information of the media file.

Process 400 may further include:
obtaining information of the media file, which includes an identification of the media file; and
determining at least two corresponding storages according to a preset first correspondence relationship between the identification of the media file and the information of the storages.

The information of the media file includes, but not limited to, one or more of a URL of the media file, a size of the media file, a name of the media file, and an identification of the media file.

The information of the storages includes, but not limited to, one or more of an address of the media file within the storage, and an identification of the storage.

For the streaming media server, the identification of the storage may be a URL of the streaming media server, such as an IP address and/or a domain name; for the client, the identification of the storage may be its MAC address and/or IP address.

Further, establishing the first correspondence relationship between the identification of the media file and the information of the storages includes:
allocating a unique identification to the media file; obtaining the information of the storages storing the media file; and forming the first correspondence relationship between the identification of the media file and the information of the storages.

The form of the first correspondence relationship between the identification of the media file and the information of the storages includes, but not limited to, one or more of a streaming media index database, and a streaming media index data table.

It will be appreciated that the established first correspondence relationship may be updated periodically to ensure the validity of the first correspondence relationship, that is, the re-obtaining of the information of the storages storing the media file and/or the deleting of the media file by the storage is reported, and then the first correspondence relationship is updated.

Process 401: The media streaming data corresponding to the media file in at least one of the determined storages is obtained, and the obtained media streaming data is played.

Determining the number of the storage for obtaining the media streaming data includes, but not limited to, one or more of setting by the user, selecting randomly, and selecting the storage of which the connection speed is larger than a threshold.

If the media streaming data corresponding to the media file in the at least two determined storages is obtained, between process 400 and process 401, the method may further include:
testing the connection speeds of the at least two determined storages.

Process 401 may further include:
obtaining the media streaming data corresponding to the media file in the storage of which the connection speed is larger than a first threshold.

If there exists no storage of which the connection speed is larger than the first threshold, the storage of which the connection speed is closest to the first threshold is selected to obtain the media streaming data.

The process of playing the media streaming data may further include that:
after determining the storage from which the media streaming data is obtained, a special file server is established at the local client, the media streaming data is parsed and encoded into a group of data packets that are recognizable and playable by the player of the local client; and the group of data packets are transmitted to the player plug-in of the local client via a certain protocol (such as HTTP://127.0.0.1/FOP.WMV), the local player plug-in then decodes and plays the group of data packets by using the Microsoft player or any other players, thereby presenting the video and audio with a clear and smooth effect to the user.

After process 401, the method may further include:
adjusting the media streaming data corresponding to the media file to be obtained, according to a received position parameter.

If the media streaming data at the corresponding position of the media file in the storage entities can not be obtained after the adjusting, a timer is initiated to stop obtaining the media streaming data at the corresponding position of the media file in the storage entities after the timer expires in a set time period.

Further, it is retried to obtain the media streaming data at the corresponding position from the storage after a period of time, and if the times for retrying to obtain the media streaming data is larger than the set times, the storage is excluded from the obtainment of the media streaming data.

The position parameter may be obtained from dragging of a process bar by the user.

A second correspondence relationship between the storage and the evaluation value may be further established, in which the evaluation value is a value indicating the connection conditions of the storage, in this case, to obtain the media streaming data corresponding to the media file in at least two determined storages, between process 400 and process 401, the method may further include:
determining the evaluation values of the storages according to the determined storages and the second correspondence relationship.

In this case, process 401 may further include:
obtaining the media streaming data corresponding to the media file in the storage according to the determined evaluation value.

Here, if the evaluation value reflects such value that is more favorable for the connection if being larger, e.g. the connection speed and the bandwidth conditions of the storage, the media streaming data corresponding to the media file in the storage of which the evaluation value is larger than a second threshold is obtained. Here, the connection speed of the storage reflected by the evaluation value may be an actual connection speed, or a grade reflecting the connection speed of the storage, such as a first grade for those connection speed under 10 KB/S, and a second grade for those connection speed between 10-50 KB/S.

If there exists no storage of which the evaluation value is larger than the second threshold, a storage of which the evaluation value is the closest to the second threshold is selected, and the media streaming data corresponding to the media file in the selected storage is obtained.

If there exists a storage having a connection speed larger than the first threshold and an evaluation value smaller than the second threshold, the media streaming data corresponding to the media file in the storage is obtained; correspondingly, if there exists a storage having a connection speed smaller than the first threshold and an evaluation value larger than the second threshold, the media streaming data corresponding to the media file in the storage is likewise obtained.

If the evaluation value reflects such value that is more favorable for the connection if being smaller, e.g. a breakage ratio and connection failure times of a storage, the media streaming data corresponding to the media file in the storage of which the evaluation value is smaller than a third threshold is obtained.

If there exists no storage of which the evaluation value is smaller than the third threshold, a storage of which the evaluation value is the closest to the third threshold is selected, and the media streaming data corresponding to the media file in the selected storage is obtained.

If there is a storage having a connection speed larger than the first threshold and an evaluation value larger than the third threshold, the media streaming data corresponding to the media file in the storage is obtained; correspondingly, if there exists a storage having a connection speed smaller than the first threshold and an evaluation value smaller than the third threshold, the media streaming data corresponding to the media file in the storage is likewise obtained.

Further, establishing the second correspondence relationship between the storage and the evaluation value includes, but not limited to, one or more of determining the evaluation value of the storage according to the connection speed of the storage and determining the evaluation value of the storage according to the times of retrying to obtain the media streaming data from the storage.

In the embodiment, if the storage is a streaming media server, the information of the storages is the streaming media server information; and if the storage is a client, the information of the storages is the client information. Since at least two storages may be determined, it is possible that the determined storages include both the streaming media server and the client, and the information of the storages is the corresponding streaming media server information and the client information.

Figure 5A:
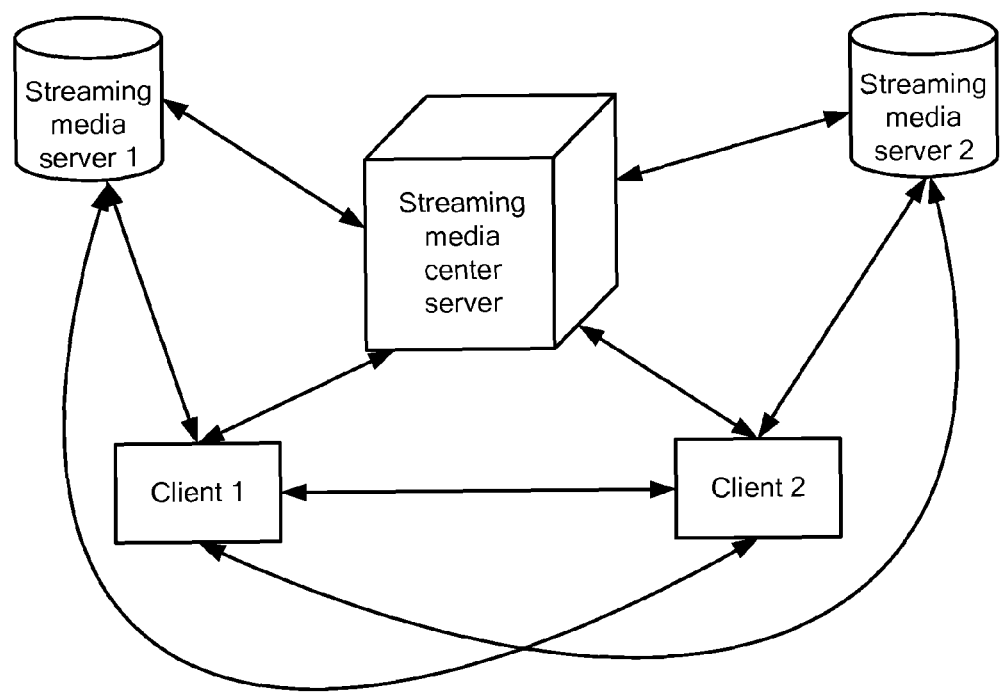
FIG. 5A is a schematic diagram showing the structure of a first streaming media system according to an embodiment of the invention.

As shown in FIG. 5A, in the schematic diagram of the structure of the first streaming media system according to an embodiment of the invention, the storages are the client and the streaming media server, a streaming media center server is used for establishing a first correspondence relationship between the identification of the media file and the information of the storages.

The streaming media center server may obtain information of both the streaming media server and the client on the internet which store the same media file, and establish a streaming media index database, which can be established through the above-described two ways of the web spider and the reporting by the user.

When a request for a media file is transmitted by a client (that is, when a link corresponding to a video and/or audio media is clicked by a user), a streaming media server and/or a client storing the media file on the internet are searched out in the streaming media index database. Then a notification carrying information of the searched out streaming media server and/or client is sent to the client transmitting the request.

Thus, the client may obtain the media streaming data corresponding to the media file from a plurality of storages, which may be a plurality of streaming media servers and/or clients storing the media file requested by the client. When receiving sufficient media streaming data, the client plays back the video and/or the audio. Moreover, the client having the received media streaming data may act as a storage providing the media streaming data for other clients.

Figure 5B:
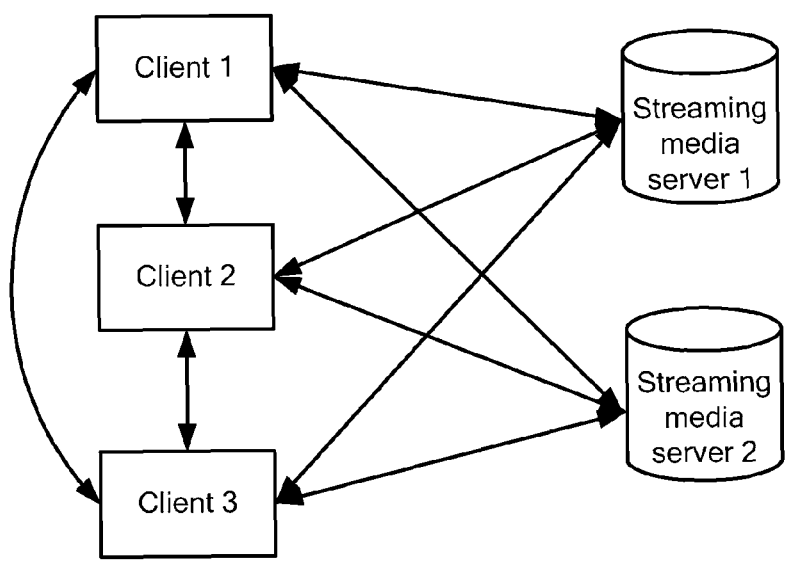
FIG. 5B is a schematic diagram showing the structure of a second streaming media system according to an embodiment of the invention.

It will be appreciated that the streaming media index database established by the streaming media center server may also be stored in the streaming media servers and/or the clients, and each of the streaming media servers and/or clients may store the whole streaming media index database, or a part of the streaming media index database, as shown in FIG. 5B.

Since the streaming media index database is stored in the streaming media servers and/or the clients, when the client transmits the request, a connection to the corresponding streaming media servers and/or clients needs to be established, for example, by using the flooding algorithm or other algorithms, or randomly. If other streaming media server information and/or client information are found using the streaming media index database, the media streaming data is obtained through the link clicked by the user.

Now the present invention is further illustrated by way of three examples of the embodiments.

In the three examples, a first correspondence relationship between the identification of the media file and the information of the storages is established by the streaming media center server, and the storages are the client and the streaming media server.

Nevertheless, in the embodiments of the invention, it will be appreciated by those skilled in the art that the first correspondence relationship between the identification of the media file and the information of the storages may not necessarily be established by the streaming media center server, and the storages may not necessarily be the client and streaming media server.

Figure 6A:
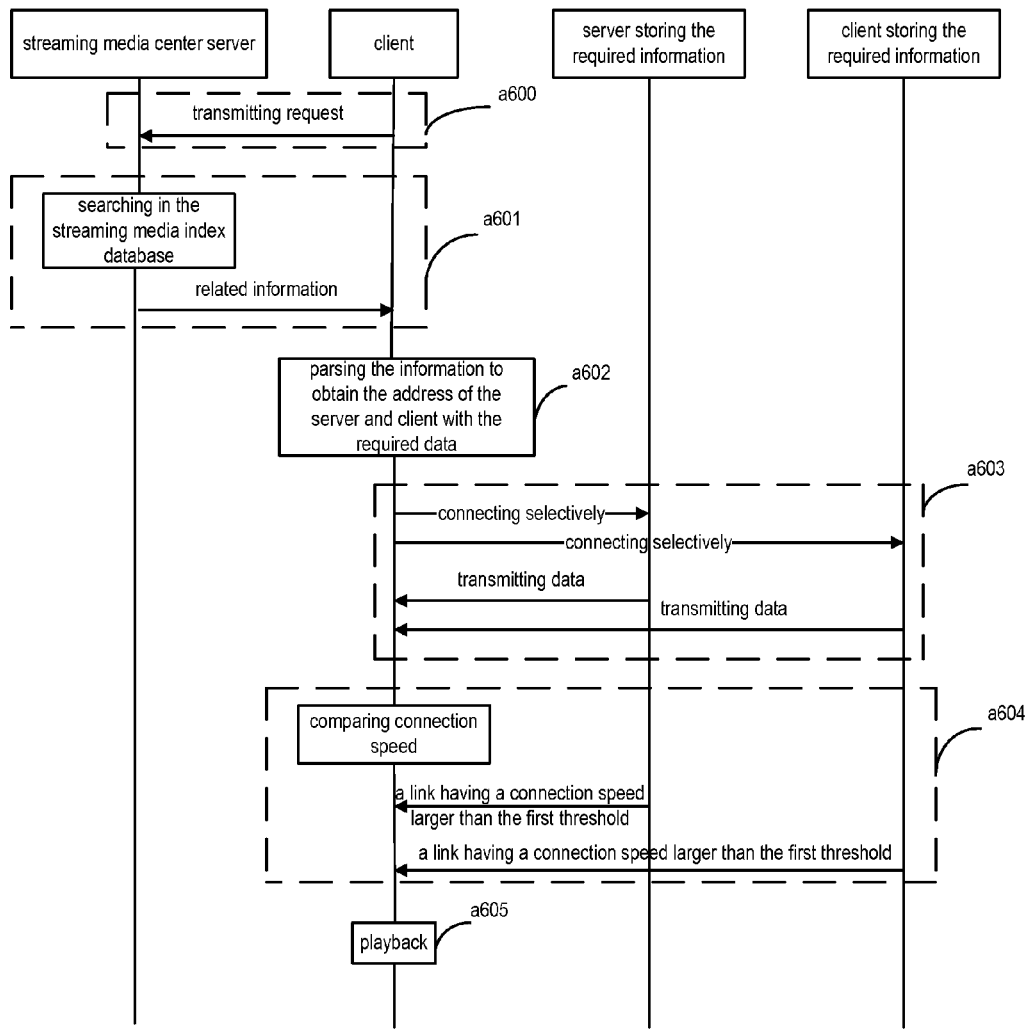
FIG. 6A is a schematic diagram of a first procedure of playing streaming media according to an embodiment of the invention.

As shown in FIG. 6A, a first procedure of playing streaming media according to an embodiment of the invention includes the following processes.

Process a600: A client transmits to the streaming media center server a Content Identity of the required streaming media file stored at the original address, for example, a CID obtained by the hash operation on the beginning, middle and ending parts of the streaming media file each having a size of 20 KB, or information such as the original address URL of the streaming media file may be included.

Process a601: The streaming media center server searches for related information of the streaming media server and other client storing the required streaming media file in the streaming media index database according to the CID, and returns the related information to the client.

Process a602: The client parses the related information, and obtains the address information of the streaming media server and other client storing the required streaming media file.

Process a603: The client connects selectively to the streaming media server and other client storing the required streaming media file, and the data is transmitted.

Process a604: The client calculates and compares the download speed of each connection, and selects a connection having a download speed larger than a first threshold and disconnects other connections.

The speed may be calculated using a formula below:

Average speed(KB/S)=length of downloaded portion of the file(KB)/downloading time(S), where, the downloading time may be a preset fixed time, such as 3 seconds, 5 seconds, or other time.

Process a605: The client plays back (i.e. play) the audio and the video after receiving sufficient streaming media data.

According to the embodiment, when the number of the resources available for downloading exceeds the upper limit of the number of the client ports set by the user, high efficient resources may be selected for the downloading.

Figure 6B:
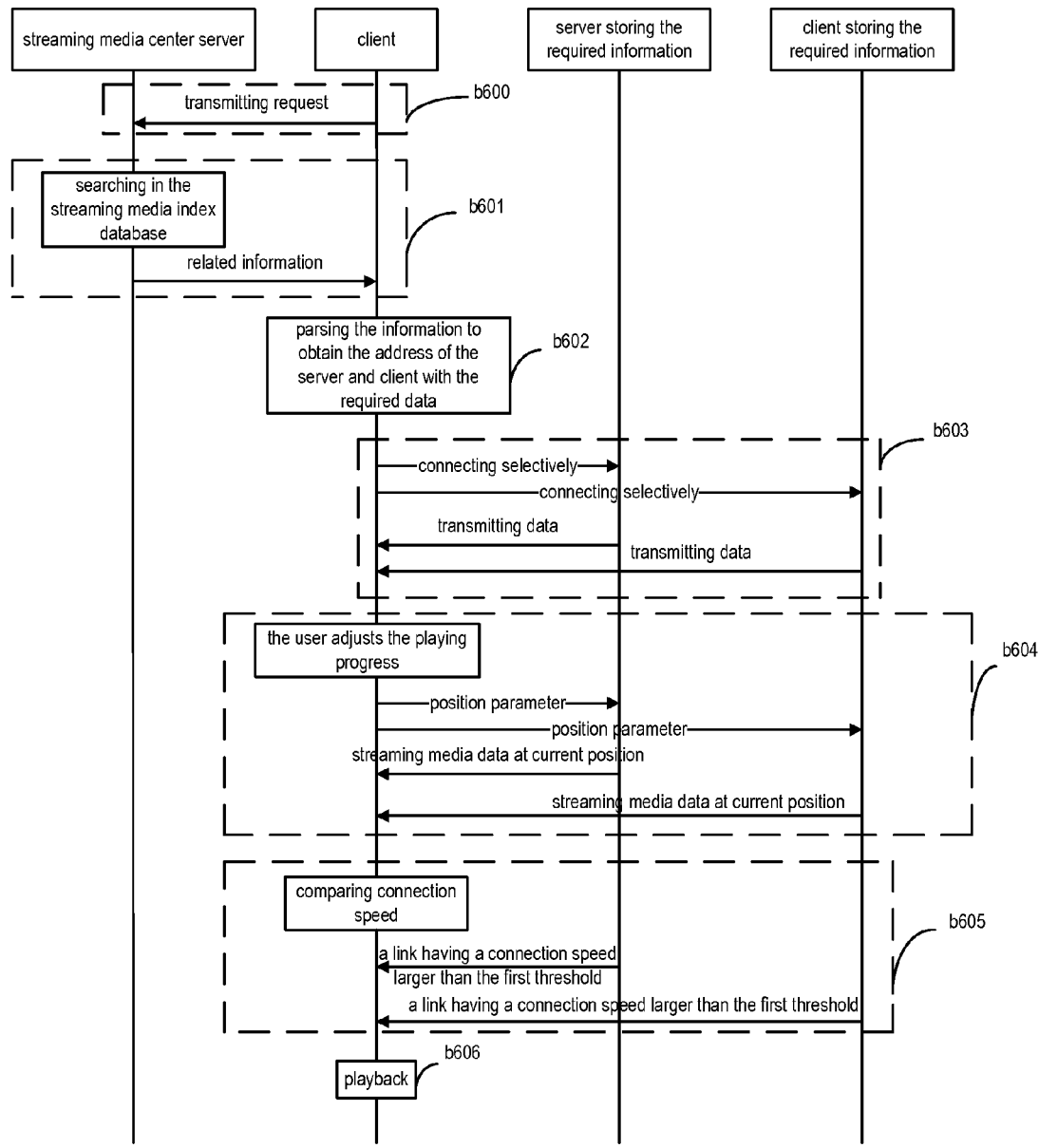
FIG. 6B is a schematic diagram of a second procedure of playing streaming media according to an embodiment of the invention.

As shown in FIG. 6B, a second procedure of playing streaming media according to an embodiment of the invention includes the following processes.

Process b600: A client transmits to the streaming media center server a Content Identity of the required streaming media file stored at the original address, for example, a CID obtained by the hash operation on the beginning, middle and ending parts of the streaming media file each having a size of 20 KB, or information such as the original address URL of the streaming media file may be included.

Process b601: The streaming media center server searches for related information of the streaming media server and other client storing the required streaming media file in the streaming media index database according to the CID, and returns the related information to the client.

Process b602: The client parses the related information, and obtains the address information of the streaming media server and other client storing the required streaming media file.

Process b603: The client connects to the streaming media server and other client storing the required streaming media file, and the data is transmitted.

Process b604: The client receives a position parameter to adjust the playing progress, transmits the position parameter to the streaming media server and other client storing the required streaming media file, and selects the streaming media server and other client storing the streaming media data corresponding to the current position indicated by the position parameter and downloads the streaming media data from the selected streaming media server and other client.

The position parameter may be obtained from the ratio of the position of the player progress bar to the size of the whole streaming media file:

Position parameter=(progress bar parameter)/(size of the whole media file)

The client transmits the current position parameter for playing the streaming media file to the available streaming media servers and other clients, and determines and selects the streaming media server and other client storing the streaming media data corresponding to the current position from the returned information.

Between process b604 and process b606, the method may further include:

Process b605: The client calculates and compares the download speed of each connection, and preferably uses the connection of which the download speed is larger than a first threshold, while other connection is used as a backup connection.

A certain number of connections are maintained when connecting, and when the connection having a connection speed larger than the first threshold fails or disconnects, the backup connection may be selected.

When the connected streaming media server and/or other client can not provide the data, a timer is started, and when the timer expires in a certain period of time, the connected streaming media server and/or other client is disconnected, and the related data is recorded. After an interval of time, it is retried to connect the disconnected streaming media server and/or other client, and the retry times are counted. When the counted retry times reach a preset value, the retry is given up, and the information of the streaming media server and/or other client and the information of the corresponding media file are reported to the streaming media center server.

Process b606: The client plays back of the audio and the video when receiving sufficient streaming media data.

Figure 6C:
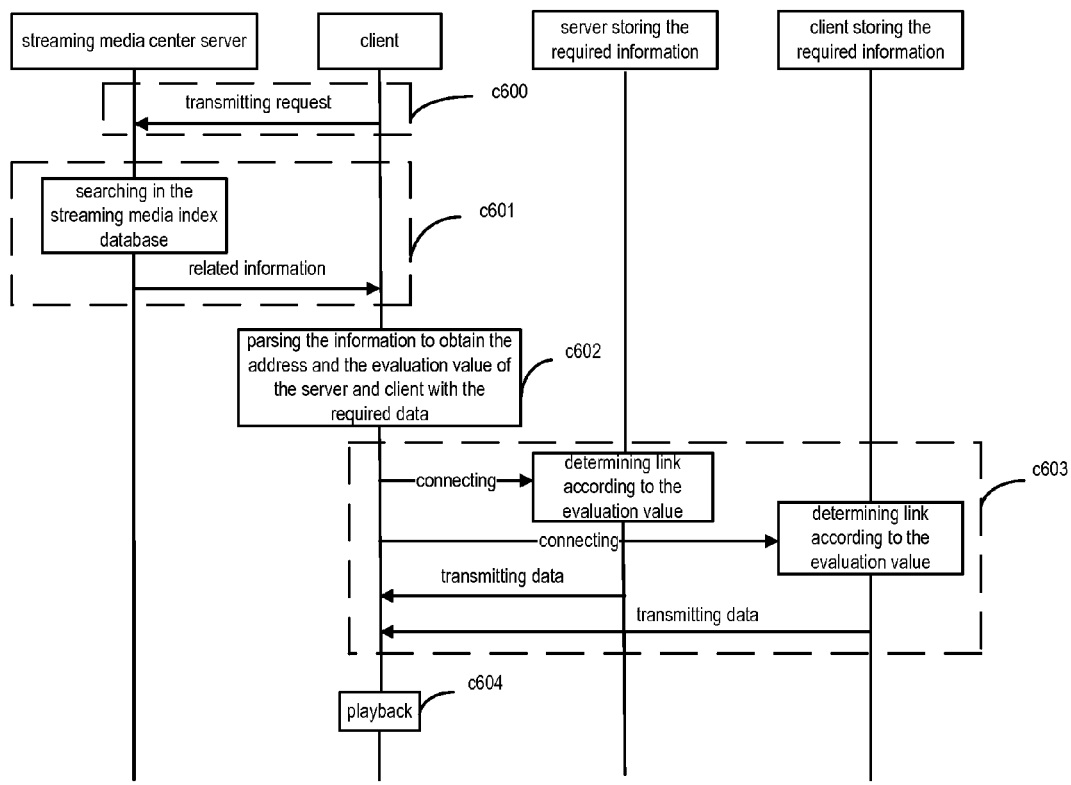
FIG. 6C is a schematic diagram of a third procedure of playing streaming media according to an embodiment of the invention.

As shown in FIG. 6C, a third procedure of playing streaming media according to an embodiment of the invention includes the following processes.

Process c600: A client transmits to the streaming media center server a Content Identity of the required streaming media file stored at the original address, for example, a CID obtained by the hash operation on the beginning, middle and ending parts of the streaming media file each having a size of 20 KB, or information such as the original address URL of the streaming media file may be included.

Process c601: The streaming media center server searches for the related information of the streaming media server and other client storing the required streaming media file in the streaming media index database according to the CID, and returns to the client the related information together with the evaluation values of the streaming media server and other client.

After the streaming media file is accessed for the first time, the client feeds the status information of the access back to the streaming media center server, which generates the evaluation values of the streaming media server and other client according to the status information and records the evaluation values.

The status information includes, but not limited to, one or more of connection conditions, data provision conditions, and a downloading speed.

Process c602: The client parses the related information, and obtains the address information and the evaluation values of the streaming media server and other client storing the required streaming media file.

Process c603: If the evaluation value reflects such value that is more favorable for the connection if being larger, e.g. the connection speed and the bandwidth conditions of the storage, the client preferably connects with the streaming media server and other client of which the evaluation values are larger than a second threshold, and the data is transmitted.

If the evaluation value reflects such value that is more favorable for the connection if being smaller, e.g. a breakage ratio and connection failure times of the storage, the client preferably connects with the streaming media server and other client of which the evaluation values are smaller than a third threshold, and the data is transmitted.

Process c604: The client plays back the audio and the video when receiving sufficient streaming media data.

Any two of or all of the procedures of playing streaming media in FIGS. 6A, 6B and 6C may be combined as desired.

It will be appreciated by those skilled in the art that the modules or the processes in the above mentioned embodiments of the present invention may be implemented by a general purpose computing device, and the modules or the processes may be integrated in a single computing device or distributed in a network composed of a plurality of computing devices. Alternatively, the modules or the processes may be implemented with a program code executable by a computing device, and therefore may be stored in a storage device and executed by a computing device; or, the modules or the processes may be manufactured into integrated circuit modules respectively, or some of the modules or processes may be manufactured into a single integrated circuit module. Thus, the invention is not limited to any specific combination of hardware and software. It will be appreciated by those skilled in the art that such variations may be made to these embodiments.

It can be seen from the above embodiments that, in the embodiments of the invention, at least two storages storing the media file are determined according to the information of the media file; the media streaming data corresponding to the media file in at least one of the determined storages is obtained and played, thereby reducing the bandwidth pressure on the streaming media server, providing a smooth and clear media streaming for the user, enhancing the user experience, and saving the cost since the number and the bandwidth of the streaming media servers need not to be increased when the number of the users increases rapidly; further, the "dead link" on the internet is eliminated, so that even when a link found by the user is invalid, the user can find other streaming media servers and/or other clients with the same media file on the internet, and play back the media streaming data; since the client obtains the media streaming data from a plurality of storages, the flow of each storage is greatly reduced, the speed is greatly enhanced, especially the buffer speed is advanced in quality; and due to the high speed of transmitting data, the video or audio with clearer pictures or voice can be transmitted, and a continuous and smooth playback effect may be maintained, thereby providing very good user experience; further, as a result of the increased number of the streaming media servers and the clients functioning as the storages, the pressure on each streaming media server is reduced.

It should be stated that the above embodiments are merely to illustrate but not limit the technical solution of the present invention. Although the present invention has been elaborately described with reference to the preferred embodiments, it will be appreciated by one skilled in the art that it is possible to modify the technical solutions described in the above embodiments, or replace a part of the technical features with equivalents without departing from the spirit and scope of the present invention.

The invention claimed is:

1. A method for playing streaming media, comprising:
utilizing at least one client computing device or integrated circuit to perform:
obtaining information of a media file, which comprises an identification of the media file and a URL of the media file;
determining at least two storages storing the media file by searching a network for the at least two storages according to a preset first correspondence relationship between the identification of the media file and information of the storages;
testing connection speeds of the determined at least two storages;
determining a storage of the at least two storages having a connection speed larger than a first threshold;
obtaining media streaming data corresponding to the media file from the storage;
playing the obtained media streaming data; and
adjusting the media streaming data corresponding to the obtained media file;
wherein establishing the first correspondence relationship between the identification of the media file and the information of the storages comprises:
allocating a unique identification to the media file;
obtaining information of the storages storing the media file; and
forming the first correspondence relationship between the identification of the media file and the information of the storages;
wherein the allocating a unique identification comprises: averaging the media file into N parts with a certain length, subjecting each of the N parts to hash operation to obtain a Block Content Identity (BCID) for each part, and then subjecting all BCIDs to hash algorithm to obtain a Global Content Identity (GCID) which acts as the unique identification corresponding to the media file.

2. The method of claim 1, wherein, the storage is a streaming media server and/or a client.

3. The method of claim 1, wherein,
the media streaming data is adjusted according to a receiving position parameter.

4. The method of claim 3, wherein, if the media streaming data at the corresponding position of the media file in the storage cannot be obtained after the adjusting, a timer is initiated, and after the timer expires in a set period of time, the obtaining of the media streaming data at the corresponding position of the media file in the storage is stopped.

5. The method of claim 1, further comprising:
utilizing at least one client computing device or integrated circuit to perform:
establishing a second correspondence relationship between the storage and an evaluation value reflecting the connection status of the storage;
wherein, to obtain the media streaming data corresponding to the media file from storage, the method further comprises:
utilizing at least one client computing device or integrated circuit to perform: before obtaining the media streaming data:
determining evaluation values of the storages according to the determined storages and the second correspondence relationship; and
obtaining the media streaming data corresponding to the media file from the storage according to the evaluation values.

6. A system for playing streaming media, comprising:
at least one computing device or integrated circuit module, configured to implement:
a determining module, adapted to obtain information of a media file, which comprises an identification of the media file and a URL of the media file, and to determine at least two storages storing the media file by searching a network for the at least two storages according to a preset first correspondence relationship between the identification of the media file and information of the storages;
a processing module, adapted to:
test connection speeds of the determined at least two storages;
determine a storage of the at least two storages having a connection speed larger than a first threshold;
obtain media streaming data corresponding to the media file from the storage;
a playing module, adapted to play the obtained media streaming data; and
an adjusting module, adapted to adjust the media streaming data corresponding to the obtained media file;
wherein establishing the first correspondence relationship between the identification of the media file and the information of the storages comprises:

allocating a unique identification to the media file;
obtaining information of the storages storing the media file; and
forming the first correspondence relationship between the identification of the media file and the information of the storages;
wherein the allocating a unique identification comprises: averaging the media file into N parts with a certain length, subjecting each of the N parts to hash operation to obtain a Block Content Identity (BCID) for each part, and then subjecting all BCIDs to hash algorithm to obtain a Global Content Identity (GCID) which acts as the unique identification corresponding to the media file.

7. The system of claim 6, wherein, the determining module comprises:
an obtaining module, adapted to obtain the information of the media file, which comprises an identification of the media file; and
a searching module, adapted to determine the at least two corresponding storages according to a preset first correspondence relationship between the identification of the media file and the information of the storages.

8. The system of claim 7, wherein the at least one computing device or integrated circuit module, configured to implement:
a tabling module, adapted to allocate a unique identification to the media file, obtain information of the storages storing the media file, and form the first correspondence relationship between the identification of the media file and the information of the storages.

9. The system of claim 7, wherein, the storage is a streaming media server and/or a client.

10. A storage device that stores program code for playing streaming media, wherein the program code is executable by a computing device to implement:
a determining module, adapted to obtain information of a media file, which comprises an identification of the media file and a URL of the media file, and to determine at least two storages storing the media file by searching a network for the at least two storages according to a preset first correspondence relationship between the identification of the media file and information of the storages;
a testing module, adapted to test connection speeds of the determined at least two storages;
a processing module, adapted to:
determine a storage of the at least two storages having a connection speed larger than a first threshold;
obtain media streaming data corresponding to the media file from the storage;
a playing module, adapted to play the obtained media streaming data; and
an adjusting module, adapted to adjust the media streaming data corresponding to the obtained media file;
wherein establishing the first correspondence relationship between the identification of the media file and the information of the storages comprises:
allocating a unique identification to the media file;
obtaining information of the storages storing the media file; and
forming the first correspondence relationship between the identification of the media file and the information of the storages;
wherein the allocating a unique identification comprises: averaging the media file into N parts with a certain length, subjecting each of the N parts to hash operation to obtain a Block Content Identity (BCID) for each part, and then subjecting all BCIDs to hash algorithm to obtain a Global Content Identity (GCID) which acts as the unique identification corresponding to the media file.

11. The storage device of claim 10, wherein, the determining module comprises:
an obtaining module, adapted to obtain the information of the media file, which comprises an identification of the media file; and
a searching module, adapted to determine at least two corresponding storages according to a preset first correspondence relationship between the identification of the media file and the information of the storages.

12. The storage device of claim 11, wherein the program code is further executable implement:
a tabling module, adapted to allocate a unique identification to the media file, obtain information of the storages storing the media file, and form the first correspondence relationship between the identification of the media file and the information of the storages.

13. The storage device of claim 10,
wherein the processing module comprises:
a connection speed determining module, adapted to determine the storage of the at least two storages having a connection speed larger than a first threshold, to obtain the media streaming data corresponding to the media file in the determined at least two storages; and
wherein the program code is further executable implement:
a first module, adapted to obtain the media streaming data corresponding to the media file in the storage determined by the connection speed determining module.

14. The storage device of claim 10, wherein
the media streaming data is adjusted according to a received position parameter.

15. The storage device of claim 14, wherein the program code is further executable implement:
a timing module, adapted to initiate a timer if the processing module fails to obtain the media streaming data at the corresponding position of the media file in the storage after the adjusting, and after the timer expires in a set period of time, the obtaining of the media streaming data at the corresponding position of the media file in the storage is stopped.

16. The storage device of claim 10, wherein the program code is further executable implement:
a storage module, adapted to store a second correspondence relationship between the storage and an evaluation value reflecting the connection status of the storage;
wherein, the processing module comprises:
an evaluation value determining module, adapted to determine the evaluation value corresponding to each storage according to the storages determined by the determining module and the second correspondence relationship, to obtain the media streaming data corresponding to the media file in the determined at least two storages; and
a second module, adapted to obtain the media streaming data corresponding to the media file in the storage according to the evaluation values.

* * * * *